United States Patent Office 3,305,501
Patented Feb. 21, 1967

3,305,501
WATER SOLUBILIZED EPOXY RESIN ESTERS OF FUMARIC- OR ITACONIC-FATTY ACID ADDUCTS
Joseph M. Spalding, Louisville, Ky., assignor, by mesne assignments, to Celanese Coatings Company, Inc., a corporation of Delaware
No Drawing. Filed Sept. 21, 1962, Ser. No. 225,369
6 Claims. (Cl. 260—18)

This invention, in one of its aspects, pertains to aqueous coating compositions. In another of its aspects, the invention pertains to water soluble epoxy esters.

In the field of industrial finishing, paints are a constant threat to safe plant operation. Although paints may not be the cause of fires, they contribute a source of inflammable material to feed spreading flames. Hence, water-based coating compositions are much more suitable. Besides the reduction in fire hazard when water is used instead of flammable solvent, there are also other reasons for the demand for water-based coating compositions by industrial finishers. Water is a cheap, odor-free, readily available thinner. Moreover, in industries such as the automobile industry where wet sanding with water is commonplace, paints adhering to damp surfaces are extremely desirable. They eliminate a drying step and thus permit faster production.

There has been a rapid public acceptance of aqueous emulsion coating compositions. However, the use of such polymer emulsions industrially has been limited because resulting films are too sensitive to water for use on automobiles, appliances, and the like. Drying oils are, of course, water insoluble, and so are epoxy esters made by combining unsaturated acids of drying oils with the known epoxy resins. Epoxy resin esters are becoming increasingly popular as a component of synthetic coatings for both air drying and baking finishes. It would, therefore, be desirable to have epoxy resin esters which could be thinned with water. In accordance with this invention, such water soluble epoxy resin esters are provided as well as coating compositions containing these water soluble epoxy resin esters as one component.

There are two types of epoxy resin esters. One such ester involves the reaction of epoxide groups of an epoxide resin with fatty acids, especially drying oil acids. Another type of epoxy ester is one wherein carboxyl groups have reacted with hydroxyl groups, either in the resin or those formed by the carboxy-epoxy reaction. In other words, the first type of ester contemplates, insofar as possible, only the reaction of epoxy groups and carboxy groups. This can be accomplished by a temperature below that required for carboxy-hydroxy reactions. The second type of ester contemplates an epoxy-carboxy reaction and the normal esterification reaction wherein acids react with alcoholic hydroxyl groups.

This invention is concerned with the first type of resin, the esterification temperature being kept low enough so that carboxy-hydroxy reactions are suppressed. The invention is based on the fact that an epoxy resin ester can be rendered soluble if the ester molecule contains free carboxyl groups as a source of water solubilization. The carboxyl groups are reacted with compositions rendering the entire ester molecule water soluble. Such compositions are well known water soluble amines and ammonia.

One method of introducing carboxyl groups into an epoxy resin ester molecule would be to react the epoxide resin with an unsaturated fatty acid and then to condense this resulting ester with an unsaturated dicarboxylic acid. The acid would be one which would not polymerize but which would form a condensate in the nature of an adduct. The free carboxyl groups in the molecule would then be available for reaction with the ammonia or a water soluble amine. It was found, however, that in such a process, gelation readily takes place during the epoxy ester-acid condensation stage.

According to the practice of this invention, a condensate, which may be an adduct, is first prepared by reacting unsaturated fatty acids, such as those derived from drying oils with an unsaturated dicarboxylic acid. The condensate formed by the reaction of an unsaturated dicarboxylic acid such as fumaric acid with the unsaturated fatty acid is then reacted with an epoxide resin to form the epoxy ester. Less than a stoichiometric amount of epoxide resin is used, however, since free carboxyl groups must be present in the resulting ester for reaction with ammonia or a water soluble amine. This invention is, then, concerned with three reactions, the condensation reaction, whether the condensate is an adduct or not, the esterification reaction, and the soluble amine salt forming reaction.

In the formation of the condensate which, as indicated hereinbefore, may or may not be an adduct, the unsaturated fatty acid is reacted with fumaric acid until all of the fumaric acid has condensed. This can be determined by solubility. The reactions of such acids as fumaric acid with unsaturated fatty acids are well known and depend on whether or not the unsaturated fatty acids contain a conjugated system of double bonds. If conjugated double bonds are present in the acid, a Diels-Alder reaction takes place to form an adduct. If there are no conjugated double bonds present, a reaction associated with Clocker and described in such patents as U.S. 2,188,182 takes place. In either event, the condensation reaction is carried out at relatively high temperatures above 390° F., generally in the range of 400° F. to 550° F.

According to this invention, the condensate formed by the reaction of an acid such as fumaric with an unsaturated fatty acid is then reacted with an epoxy resin at a lower temperature which will minimize a carboxy-hydroxy esterification reaction, but which is sufficient to permit complete reaction of the epoxide groups with carboxyl groups. The esterification of all the acid groups of the adduct with the epoxy resin is therefore an incomplete reaction since free carboxyl groups must be present. Excess carboxyl groups remaining after this reaction are then reacted with the ammonia or a water soluble amine to form the water soluble ester. Amine-carboxy reactions are well known and no particular difficulties need be noted.

In making condensates of the type employed herein, the fatty acid and the fumaric acid are normally condensed at a temperature above 390° F. in a ratio of one mol of fatty acid per mol of fumaric acid. This condensate can be employed in making the esters contemplated herein. As a practical matter, however, useful and water soluble esters are obtained when less than one mol of fumaric acid per mol of fatty acid is used. This being the case, the amount of fumaric acid can best be expressed in terms of percent by weight based on the unsaturated fatty acids. The result is that a mixture of condensate and additional fatty acid is reacted with an epoxide resin during the esterification stage. However, rather than reacting the fatty acid and the fumaric acid on a one to one mol basis and then adding fatty acid, it is desirable to react the unsaturated fatty acids with less than one mol of fumaric acid per mol of fatty acid. Fatty acids, mixtures of fatty acids or mixtures of fatty acids with drying oils, which mixtures contain not more than 50 percent oil, thus are reacted with 5 to 25 percent fumaric acid based on the fatty acid, or fatty acid mixture. The resulting condensate compositions will have acid values in the range of 165 to 305.

In the esterification stage of the process, the fatty acid condensate is cooled from the condensation temperature to a figure below that at which any substantial carboxy-hydroxy esterification takes place. While the condensation is carried out above 390° F., the esterification reaction is carried out below 390° F. Usually the esterification reaction is conducted at a temperature in the range of 300° F. to 350° F.

In the preparation of the ester, it must be kept in mind that free carboxyl groups must be present in the final ester composition to react with the ammonia or water soluble amine to form a soluble amine salt. The reaction of the adduct with the epoxide resin is conducted under conditions that will allow complete reaction of the epoxide groups of the epoxide resin with the carboxylic acid groups of the adduct. However, the esterification reaction, as generally understood in the art, is not allowed to go to completion, that is, the reaction is carried out under such conditions as to prevent insofar as possible the condensation of the acid groups of the adduct with the hydroxyl groups of the epoxide resin. Free carboxyl groups must be present in the resulting ester for later reaction with ammonia or a water soluble amine. The extent of reaction is best controlled by reference to the acid value of the ester. The esterification process can, therefore, logically be described in terms of acid value. As indicated, the acid number of the fatty acid-fumaric acid condensate or condensate mixture is 165 to 305. In making the ester, this condensate is reacted with sufficient epoxide resin to reduce the acid value to one-half to one-third its initial value with all of the epoxide groups reacted, various condensates having different acid values within the range. Thus, a condensate of 90 percent linseed oil fatty acids and 10 percent fumaric acid has an acid value of 277. By the practice of this invention, the condensate is reacted with sufficient diglycidyl polyether of bisphenol to reduce the acid value to 93 to 139. A desirable ester prepared in the laboratory had an acid value of 106, the composition containing 30 percent epoxide resin. Generally when the condensate is reacted with epoxide resin, the resulting epoxy ester contains 10 to 40 percent by weight epoxide resin and has an acid value of 50 to 150. The amount of epoxide resin to use with the condensate can also be calculated. The carboxy equivalency of the condensate can be determined from the acid value. From the carboxy equivalency of the condensate, the epoxy equivalency of the epoxide resin, and the desired acid value, the amount of epoxide resin to use with a given condensate can be derived. The reactants are then held at the reaction temperature for the desired acid number of the resulting epoxy ester, avoiding insofar as possible, the carboxy-hydroxy reaction.

To form the soluble ester composition, the resulting epoxy ester can be reacted directly with ammonia or an amine to form a water soluble amine salt. In many instances, however, the resulting epoxy ester will be quite viscous and difficult to use with the amine. In such cases prior to reaction with the ammonia or water soluble amine, it is desirable to thin the epoxy ester with a small amount of an organic solvent. These solvents are the well known epoxy ester solvents except that in this case they must be water miscible solvents, since the resin will be subsequently thinned with water. Such solvents are n-propyl alcohol, isopropyl alcohol, 3-methoxybutyl alcohol, ethylene glycol methylether, ethylene glycol ethylether, 2-ethoxyethanol, 2-butoxyethanol, diethylene glycol butylether, diacetone alcohol, and dimethyl formamide. After the epoxy ester is thinned to a more suitable viscosity, the water soluble amine to be used is slowly added keeping the temperature below 150° F. to prevent conversion of the soluble amine salt to an insoluble amide and to prevent hydrolysis of the ester groups. After all of the amine has reacted, the resulting epoxy ester is thinned with water to the desired solids level and filtered.

This invention has been described with reference to fumaric acid. This acid is preferred because other unsaturated dicarboxylic acids more readily form anhydrides. Anhydrides are epoxy curing agents. In addition, anhydride groups have a great affinity for hydroxide groups. Such acids which do not extensively form the anhydride during the condensation reaction, however, can be used, for instance, fumaric, itaconic, and citraconic.

The unsaturated acids which are used in the preparation of the condensate are fatty acids having 10 to 24 carbon atoms. Such acids are normally derived from drying oils but can be obtained from any source. Included are such acids as decenoic, lauroleic, myristoleic, palmitoleic, oleic, gadoleic, erucic, selacholeic, linoleic, hexadecatrienoic, linolenic, octadecatetraenoic, arachidonic, eicosapentaenoic, docosapentaenoic, docosahexaenoic, tetracosapentaenoic, tetracosahexaenoic, ricinoleic and licanic.

When drying oils are used with the free acids, true drying oils are preferred. Normally such drying oils will be used as linseed oil, soybean oil, dehydrated castor oil, fish oils, tung oil, and oiticica oil. In addition, coconut oil and other vegetable oils will be used.

The epoxide resins which are reacted with the condensate to form the epoxy esters are epoxide resins (glycidyl polyethers of dihydric phenols or aliphatic polyols) having an epoxide equivalent below 1000. As well known in the art, such epoxide resins are made by condensing glycerol dichlorohydrin or epichlorhydrin with ethylene glycol, diethylene glycol, glycerol, diglycerol, catechol, resorcinol, a trihydroxybenzene, a di(hydroxyphenyl)methane, a di(hydroxyphenyl)ethane, a di(hydroxyphenyl)propane, dihydroxydiphenyl sulfone, etc. according to U.S. Patents 2,581,464, 2,582,985, 2,615,-007, 2,615,008, 2,698,315 and 2,731,444. By reference, the aforementioned patents are intended to be included as a part of the present description of the epoxide resins, and for brevity the epoxide resin will not be described other than as a polyether having terminal epoxide groups on vicinal carbon atoms.

It should be understood that equivalent results will not necessarily be obtained using all of the unsaturated fatty acids with any epoxide resin. One skilled in the art will choose an epoxide resin and a fatty acid known to form an ester having the properties which he desires in the final product. In some instances, a liquid epoxide resin will be indicated while in others a solid epoxide resin will be used. Likewise, a particular fatty acid employed will vary depending upon the desired curing mechanism. Preferred combinations are fatty acids derived from soya oils with liquid epoxy resins and resins having epoxy equivalents of 300 to 400.

To render the epoxy esters water soluble, ammonia or water soluble amines are used. Water soluble amines are preferred because more viscous products result when ammonia is used. Water soluble amines are well known, and the amine will depend on the end use of the final composition. Films of these compositions will be cured at temperatures up to 400° F. The higher temperatures will decompose the amine salts either to the free amines which will volatilize from the films, or to the amides. It is preferred to use a volatile amine, that is, an amine which will volatilize from the film at the temperature at which the film is dried. When a non-volatile amine, which remains in the cured composition, is used the curing temperature should be sufficiently high to convert the amine salt to the amide. It is desirable to convert the amine salt to an amide or to a free amine which leaves the cured composition, since it is well known that amine salts are associated with poor water resistance. When volatile water soluble amines are used, the resulting films will contain carboxyl groups. These carboxyl groups readily lend themselves to systems employing water soluble carboxy-cross-linking agents. Films of the water soluble ester can be made without the use of a curing agent. However, curing agents, as will be discussed later, are preferred. The water soluble amines contemplated herein are used in an amount sufficient to confer water solubility on the epoxy ester. As a maximum, one mol of amine per carboxyl group present in the ester is employed. However, water solubilization can be obtained by using less than this amount. Ordinarily, 5 to 20 percent by weight of amine based on the ester is sufficient. Suitable water soluble amines are ethyl amine, diethyl amine, triethyl amine, propyl amine, dipropyl amine, isopropyl amine, diisopropyl amine, butyl amine, dibutyl amine, 2-ethylhexyl amine, dimethylamino propylamine, diethylamino propylamine, ethylene diamine, propylene diamine, ethanolamine, methyl ethanolamine, dimethyl ethanolamine and diethyl ethanolamine.

This invention can perhaps be better understood by reference to specific examples. The epoxide resins employed in the examples are prepared by condensation of various proportions of epichlorhydrin and bisphenol followed by subsequent dehydrohalogenation with sodium hydroxide. The table which follows indicates the ratio of epichlorhydrin to bisphenol used to prepare the epoxide resins.

In the examples, the epoxide resins will be referred to as Epoxide Resin A or Epoxide Resin B, and all parts are intended to mean parts by weight.

| Epoxide Resin | Ratio (mols) | | Epoxide Equivalent |
| --- | --- | --- | --- |
| | Epichlorhydrin | Bisphenol, p, p'-dihydroxy-diphenyldimethyl methane | |
| A | 10 | 1 | 190 |
| B | 1.57 | 1 | 500 |

*Example 1*

To a five liter flask equipped with stirrer, thermometer and condenser are added 900 parts of a fatty acid mixture [1] (average molecular weight 288), 930 parts alkali refined linseed oil (molecular weight 868) and 270 parts fumaric acid (molecular weight 116). The flask contents are blanketed with nitrogen, agitation is begun, and the reactants are heated to 500° F. After one hour at 500° F., the reaction mixture is compatible, the acid value being 207. Heat is removed and the temperature is lowered to 120° F. To the flask are added 600 parts of Epoxide Resin B and 300 parts of Epoxide Resin A. The temperature is raised and held at 285° F. to 315° F. for 45 minutes. Compatibility is obtained and no epoxide groups remain in the resin. The acid value is 94, the calculated acid value, assuming no carboxyl-hydroxyl reaction, being 99. The resin is reduced to 80 percent solids with butyl Cellosolve to a Gardner-Holdt viscosity

[1] The fatty acid mixture has the following composition: 98 percent fatty acids—54 percent oleic acid, 45 percent linoleic acid, 1 percent saturated acid.

of X-Y. To 746 parts of this solution are added 73 parts of diethylamine and 375 parts of water. The resulting clear epoxy ester solution has a viscosity of $Z_3$-$Z_4$.

The epoxy ester solution is blended with 10 percent by weight on a solids basis of a commercial, infinitely water soluble, methylated methylol melamine resin, a heavy clear liquid composition of 80 percent solids in water, specific gravity 1.2, pH 10. Films are prepared by spraying the solution on steel panels bonderized with zinc phosphate which are then baked at 350° F. for 20 minutes. The resulting films are well cured and have excellent flexibility. Films prepared by the same procedure from the resin solution but without the addition of the melamine resin are softer than those containing the melamine resin but have excellent flexibility.

*Example 2*

To a five liter flask equipped as in Example 1 are added 1680 parts of dehydrated castor oil fatty acids (average molecular weight 288) and 270 parts of fumaric acid. The flask contents are blanketed with nitrogen and agitation is begun. The reactants are heated to 400° F. and held at this temperature for six hours until compatibility is obtained, the acid value being 303. The temperature is then lowered to 300° F. and 1050 parts of Epoxide Resin A are added. The temperature is held at 300° F. for four hours. Compatibility is obtained and no epoxide groups remain. The acid value of the product is 91, the calculated acid value being 100. The resin is reduced to 80.6 percent solids with butyl Cellosolve to a Gardner-Holdt viscosity of $Z_2$-$Z_3$. To 704 parts of this solution is added 73 parts of diethylamine and 349 parts of water. A clear solution results with a viscosity of $Z_5$-$Z_6$.

*Example 3*

Using the same procedure as in Example 1, 1123.5 parts of the fatty acid mixture used in Example 1, 1123.5 parts of soybean oil and 203 parts of fumaric acid are added to a five liter flask. With agitation and under a nitrogen blanket, the reactants are heated to 500° F. and held at 500° F. for three and one-half hours when compatibility is obtained, the acid value being 170. 1050 parts of Epoxide Resin B are added to the flask over a thirty minute period at a temperature of 300° F. The temperature is held at 300° F. for two and one-half hours. At this point no epoxide groups remain and the acid value is 80, the calculated acid value being 87. The resin is reduced to 80 percent solids in butyl Cellosolve to a viscosity of Y-Z. To 1000 parts of this solution are added 118.5 parts of diethanol amine and 334.5 parts of water. The resulting clear solution has a viscosity of $Z_2$-$Z_3$.

*Example 4*

According to the same procedures as in the previous examples, a mixture with an acid value of 277, consisting of 63 parts of distilled linseed fatty acids and 7 parts of fumaric acid are condensed. This composition is then reacted with 30 parts of Epoxide Resin B to an acid value of 106, the calculated acid value being 104. This resin is reduced to 80 percent solids with butyl Cellosolve to a viscosity of $Z_3$-$Z_4$. To 50 parts of this solution are added 5.52 parts of diethyl amine and 44.8 parts of water. The clear solution has a viscosity of $Z_3$-$Z_4$.

*Example 5*

Following the same procedure as described in the preceding examples, 54 parts of the fatty acid mixture of Example 1 are reacted with 6 parts of fumaric acid. This composition, with an acid value of 273, is reacted with 40 parts of Epoxide Resin B to an acid value of 99, the calculated acid value being 121. Forty parts of this resin are dissolved in 18 parts of isopropyl alcohol. Ammonium hydroxide (4.4 parts of 28.7 percent $NH_3$) is added to the resin solution, followed by the addition of 36.1 parts water. The viscosity of this solution is considerably higher than $Z_6$. A solution with a workable viscosity is produced by replacing half the ammonia with an equivalent amount of diethanol amine. The viscosity of the resulting solution is $Z_6$–$Z_7$ at 35 percent solids and $Z_1$–$Z_2$ at 30 percent solids.

The resin solutions described in Examples 2 through 5 are cured as described in Example 1 producing equivalent results.

The foregoing examples show that water soluble epoxy resins having outstanding properties can be obtained by the practice of this invention. The examples show that the epoxy ester solution, per se, can be heated to form solids on the liberation of the solvent. However, those skilled in the art will appreciate that the properties of the solid can be varied by the curing mechanism. An important feature of this invention is based on the aliphatic hydroxyl content of the water soluble epoxy compositions. Aliphatic hydroxyl groups are present in the starting epoxide resins and such groups are also produced by the carboxy-epoxy reaction. These hydroxyl groups can be readily reacted with water soluble cross-linking agents such as water soluble aminoplasts. Suitable water soluble aminoplasts are alkylated condensates formed by the reaction of amino-triazines and amino-diazines with aldehydes. It is known that various amines and amides will condense in the presence of alcohols with aldehydes to form alkylated aldehyde-amine and aldehyde-amide condensates. Thus, urea, thiourea, and various substituted ureas and urea derivatives will react with aldehydes such as formaldehyde to form alkylated condensates, e.g., methylol ureas, etc. Similarly, it is well known that melamines, such as melamine itself and benzoquanamine will react with aldehydes, particularly formaldehyde, to form melamine-aldehyde condensates. Various other amines and amides can similarly be reacted with formaldehyde etc., to form alkylated condensates which are alkylated amine aldehyde or amide aldehyde resins or condensates. Such condensates which are water soluble can be used. Water soluble alkylated condensates result when the amino aldehyde or amide aldehyde resin is prepared in the presence of alcohols such as methyl, ethyl and propyl, these solvents actually becoming part of the resulting product. In general, 5 to 30 percent based on the ester of urea or melamine aldehyde condensates of different degrees of condensation can be used so long as they are water soluble. Alkylated melamine aldehyde condensates are, however, the preferred aminoplast resins.

It is understood that in addition to water soluble aminoplast resins, other compositions can be used with these. In addition, other components can be added to obtain specialized properties. Since such modifications and variations will occur to one skilled in the art, they are deemed to be within the scope of this invention.

What is claimed is:

1. A process for the preparation of water soluble epoxy esters which comprises
   (I) at a temperature above 390° F. heating and condensing
      (A) an unsaturated fatty acid having 10 to 24 carbon atoms in its hydrocarbon chain with
      (B) 5 to 25 percent by weight based on the unsaturated fatty acid of fumaric acid to form a condensate-fatty acid mixture having an acid value in the range of 165 to 305
   (II) subsequently at a temperature below 390° F. which suppresses carboxy-hydroxy reactions, reacting the condensate-fatty acid mixture with sufficient glycidyl polyether of a dihydric phenol or aliphatic polyol, having an epoxide equivalent below 1000, to reduce the acid value to one-half to one-third of its initial value, forming an epoxy ester composition, the acid value indicating the presence of carboxy groups in the composition
   (III) and then reacting the epoxy ester composition with sufficient amino compound selected from the group consisting of ammonia and water soluble amines to form a water soluble amine salt of the epoxy ester composition.

2. The process of claim 1 wherein as the fatty acid A linseed oil fatty acids are employed, wherein ten percent fumaric acid is used as B, wherein the diglycidyl ether of p,p'-dihydroxydiphenyldimethyl methane is employed in an amount sufficient to reduce the acid value from 277 to 106, and wherein diethylamine is employed in III.

3. The process of claim 1 wherein a mixture of one part linseed oil and one part fatty acids having an acid value of 207 are used as A, wherein twelve percent fumaric acid based on the acid-oil mixture is used as B, wherein a glycidyl polyether of p,p'-dihydroxydiphenyldimethyl methane having an epoxide equivalent of 500 is used in an amount sufficient to reduce the acid value from 207 to 99, and wherein diethylamine is employed in III.

4. A process for the preparation of water soluble epoxy esters which comprises
   (I) at a temperature below 390° F. which suppresses carboxy-hydroxy reactions, reacting
      (A) the condensation product of
         (1) a fatty acid substance selected from the group consisting of unsaturated fatty acids having 10 to 24 carbon atoms in its carbon chain, and
         (2) 5 to 25 percent by weight based on an acid selected from the group consisting of fumaric acid and itaconic acid, said condensation product having an acid value in the range of 165 to 305, with
      (B) sufficient glycidyl polyether of a dihydric phenol or aliphatic polyol having an epoxide equivalent below 1000 to reduce the acid value of A to one-third to one-half of its initial value to form an epoxy ester composition, the acid value indicating the presence of carboxyl groups in the composition,
   (II) and then reacting the resulting epoxy ester composition through the carboxyl groups with sufficient amino compound selected from the group consisting of ammonia and water soluble amines to confer water solubility on the epoxy ester composition.

5. As a water soluble resin particularly suitable as a metal primer when thinned with water, the reaction product of
   (A) the condensation product of
      (1) a fatty acid substance selected from the group consisting of unsaturated fatty acids having 10 to 24 carbon atoms in its carbon chain, and
      (2) 5 to 25 percent by weight based on an acid selected from the group consisting of fumaric acid and itaconic acid, said condensation product having an acid value in the range of 165 to 305, with
   (B) sufficient glycidyl polyether of a dihydric phenol or aliphatic polyol having an epoxide equivalent below 1000 to reduce the acid value of A to one-third to one-half of its initial value to form an epoxy ester, the acid value indicating the presence of carboxyl groups in the composition,
which reaction product has been rendered water soluble by reaction with sufficient amino compound selected from the group consisting of ammonia and water soluble amines to confer water solubility on the epoxy ester composition.

6. As a water soluble resin particularly suitable as a metal primer when thinned with water, the reaction product having an acid value of 50 to 150 of
   (A) a condensate of a fatty acid and fumaric acid containing 5 to 25 percent by weight of the fumaric acid with (B) 10 to 40 percent of a glycidyl polyether of a dihydric phenol or aliphatic polyol having an epoxide equivalency below 1000, which reaction product has been rendered water soluble by reaction with sufficient water soluble amine to confer water solubility on the composition.

References Cited by the Examiner

UNITED STATES PATENTS

| | | | |
|---|---|---|---|
| 2,262,923 | 11/1941 | Clocker | 260—404 |
| 2,848,433 | 8/1958 | Eirich | 260—18 |
| 2,890,189 | 6/1959 | Greenlee | 260—29.2 |
| 2,914,508 | 11/1959 | Williams et al. | 260—21 |
| 2,915,486 | 12/1959 | Shelley | 260—21 |
| 2,967,837 | 1/1961 | Greenfield | 260—18 |
| 3,027,340 | 3/1962 | Masters | 260—18 |
| 3,027,341 | 3/1962 | Boucher et al. | 260—29.2 X |
| 3,050,480 | 8/1962 | Budde | 260—18 |

LEON J. BERCOVITZ, *Primary Examiner.*

JAMES A. SEIDLECK, *Examiner.*

C. W. IVY, R. W. GRIFFIN, *Assistant Examiners.*